(12) United States Patent
Johnson

(10) Patent No.: US 7,926,290 B2
(45) Date of Patent: Apr. 19, 2011

(54) TURBINE ENGINE WITH MODULATED FLOW FAN AND METHOD OF OPERATION

(75) Inventor: James E. Johnson, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 1123 days.

(21) Appl. No.: 11/612,012

(22) Filed: Dec. 18, 2006

(65) Prior Publication Data

US 2008/0141676 A1   Jun. 19, 2008

(51) Int. Cl.
*F02C 6/04* (2006.01)
(52) U.S. Cl. .............. 60/785; 60/226.3; 60/782; 60/204
(58) Field of Classification Search ............. 60/268, 60/39.162, 226.3, 785, 782, 783, 728
See application file for complete search history.

(56) References Cited

U.S. PATENT DOCUMENTS

| | | | | |
|---|---|---|---|---|
| 4,043,121 A | * | 8/1977 | Thomas et al. | 60/204 |
| 4,351,150 A | * | 9/1982 | Schulze | 60/226.1 |
| 4,404,793 A | * | 9/1983 | Coffinberry | 60/785 |
| 4,791,783 A | * | 12/1988 | Neitzel | 60/262 |
| 4,798,328 A | * | 1/1989 | Thayer et al. | 239/1 |
| 5,079,916 A | | 1/1992 | Johnson | |
| 6,619,030 B1 | | 9/2003 | Seda et al. | |
| 6,684,626 B1 | | 2/2004 | Orlando et al. | |
| 7,134,271 B2 | | 11/2006 | Baughman et al. | |
| 7,140,174 B2 | | 11/2006 | Johnson | |
| 7,144,221 B2 | | 12/2006 | Giffin | |
| 7,188,467 B2 | | 3/2007 | Johnson | |
| 7,216,475 B2 | | 5/2007 | Johnson | |
| 7,246,484 B2 | * | 7/2007 | Giffin et al. | 60/268 |

* cited by examiner

*Primary Examiner* — Michael Cuff
*Assistant Examiner* — Craig Kim
(74) *Attorney, Agent, or Firm* — Trego, Hines & Ladenheim, PLLC

(57) ABSTRACT

A gas turbine engine includes a turbomachinery core operable to generating a flow of pressurized combustion gases; a rotating fan adapted to extract energy from the core and generate a first flow of pressurized air; a fan stator assembly connected in flow communication with the fan and operable to vary the first flow of pressurized air while the fan operates at a substantially constant speed; a fan outer duct surrounding the core; and a flade stage comprising a supplementary fan disposed in the fan outer duct and driven by the fan for generating a pressurized bleed air flow.

5 Claims, 5 Drawing Sheets

TURBINE ENGINE WITH MODULATED FLOW FAN AND METHOD OF OPERATION

BACKGROUND OF THE INVENTION

This invention relates generally to gas turbine engines and more particularly to a turbofan engine in which the fan flow can be modulated independent of the fan speed.

It is known to extract bleed air from a turbine engine to perform functions such as flap blowing, boundary layer control, and lift enhancement in an aircraft. In particular, Short Takeoff and Landing (STOL) aircraft can utilize engine bleed air for wing lift enhancement during the take-off and landing phases of flight. Such aircraft require that the bleed air flow and pressure levels remain essentially constant, even though the engine thrust will vary over a band of about 20% to 100% of maximum, depending on the phase of flight. Bleed pressure levels must also be sufficiently high to keep pipe sizes reasonable for a given bleed energy level. Also, in a multi-engine aircraft, for one engine out operation, the engine system must be capable of generating the equivalent bleed energy of that needed with all engines operating. Immediate operating engine response to an engine out failure is also desired. These requirements present several problems for conventional engine systems since engine bleed air source pressures and flows vary widely over the operating thrust band and, during approach and landing, LP spool speeds are greatly reduced which can result in unacceptable spool-up times.

BRIEF SUMMARY OF THE INVENTION

The above-mentioned shortcomings in the prior art among others are addressed by the present invention, which according to one aspect provides a gas turbine engine, including: a turbomachinery core operable to generating a flow of pressurized combustion gases; a rotating fan adapted to extract energy from the core and generate a first flow of pressurized air; a fan stator assembly connected in flow communication with the fan and operable to vary the first flow of pressurized air while the fan operates at a substantially constant speed; a fan outer duct surrounding the core; and a flade stage comprising a supplementary fan disposed in the fan outer duct and driven by the fan for generating a pressurized bleed air flow.

According to another aspect of the invention, a method of operating a gas turbine engine includes burning a fuel in a turbomachinery core to produce a first flow of pressurized combustion gases; extracting energy from the first flow of pressurized combustion gases and using the energy to generate a first flow of pressurized air with a rotating fan; selectively varying a flow area through the fan to vary the first flow of pressurized air while the fan rotates at a substantially constant speed; and using the fan to mechanically drive a flade stage comprising a supplementary fan disposed in a fan outer duct so as to generate a pressurized bleed air flow having a magnitude independent of the first flow of pressurized air.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
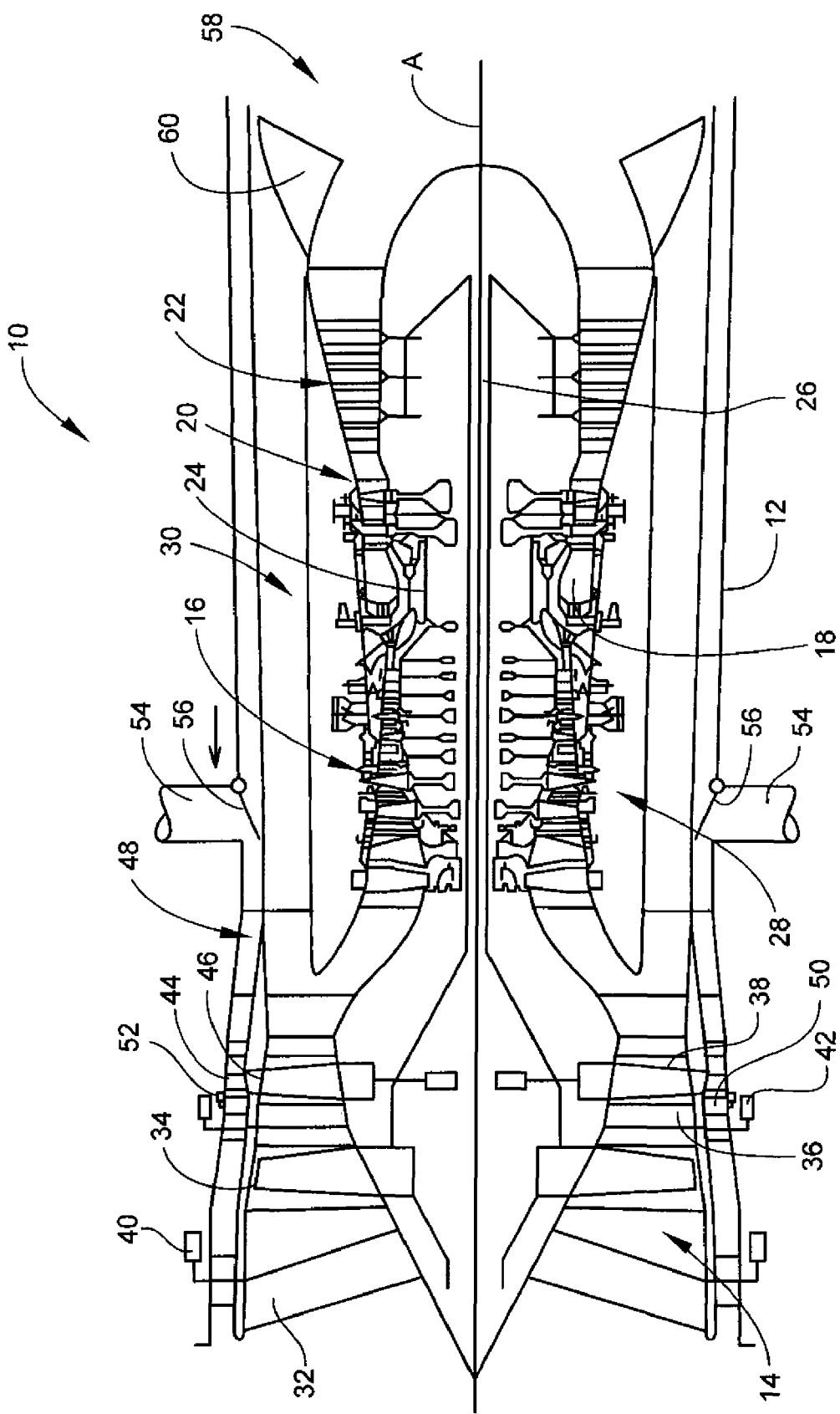
FIG. 1 is a schematic cross-sectional view of a gas turbine engine constructed according to an aspect of the present invention.

Referring to the drawings wherein identical reference numerals denote the same elements throughout the various views, FIG. 1 illustrates a portion of an exemplary gas turbine engine, generally designated 10. The engine 10 has a longitudinal center line or axis A and an outer stationary annular casing 12 disposed concentrically about and coaxially along the axis A. The engine 10 has a fan 14, compressor 16, combustor 18, high pressure turbine 20, and low pressure turbine 22 arranged in serial flow relationship. In operation, pressurized air from the compressor 16 is mixed with fuel in the combustor 18 and ignited, thereby generating pressurized combustion gases. Some work is extracted from these gases by the high pressure turbine 20 which drives the compressor 16 via an outer shaft 24. The combustion gases then flow into the low pressure turbine 22, which drives the fan 14 via an inner shaft 26. The fan 14, inner shaft 26, and low pressure turbine 22 are collectively considered portions of a "low pressure spool" or "LP spool" (not labeled in the Figures).

A portion of the fan discharge flows through the compressor 16, combustor 18, and high-pressure turbine 20, which are collectively referred to as the "core" 28 of the engine 10. Another portion of the fan discharge flows through an annular bypass duct 30 which surrounds the core 28. The illustrated fan 14 includes, in flow sequence, a row of non-rotating fan inlet guide vanes or "IGVs" 32, a first stage of rotating fan blades 34, a row of non-rotating interstage vanes 36, and a second stage of rotating fan blades 38. The inlet guide vanes 32 may have their angle of attack with respect to the airflow and their open flow area selectively changed by using an actuator 40 of a known type. Optionally, the interstage vanes 36 may have their angle of attack with respect to the airflow and their open flow area selectively changed by using an actuator 42 of a known type. Collectively, the fan IGVs 32 and the interstage vanes 36 are referred to as a fan stator assembly. The principles of the present invention are equally applicable to other engine configurations.

The engine 10 also includes a supplementary fan, referred to as a "FLADE" stage 44 in the form of a ring of airfoils extending radially outwardly from an annular shroud 46 and driven by the fan 14 (in this case the second stage 36). The FLADE stage 44 is positioned in a fan outer duct 48 which surrounds the bypass duct 30. The FLADE stage 44 provides an additional flow stream at a different flow and pressure ratio that than of the fan 14. Other fan stage counts with possibly FLADE stages on more than one fan blade could also be used, depending on the final selection of fan and FLADE pressure ratios. The FLADE stage flow is sized to provide sufficient bleed air pressure and flow for a selected aircraft bleed-air powered system of a known type (not shown). A row of variable-angle FLADE inlet guide vanes 50, operated by an actuator 52, are moveable between open and closed positions to vary the flow through the FLADE stage 44.

The fan outer duct 48 includes one or more bleed air outlets 54 which direct flow to the aircraft bleed air system. Bleed air valves 56 may also be provided to selectively close off the bleed air outlets 54 and direct the FLADE stage flow downstream through the fan outer duct 48.

An exhaust duct 58 is disposed downstream of the core 28, and receives the mixed air flow from both the core 28 and the bypass duct 30. A mixer 60 (for example a lobed or chute-type mixer) is disposed at the juncture of the core 28 and bypass duct 30 flow streams to promote efficient mixing of the two streams.

Figure 2A:
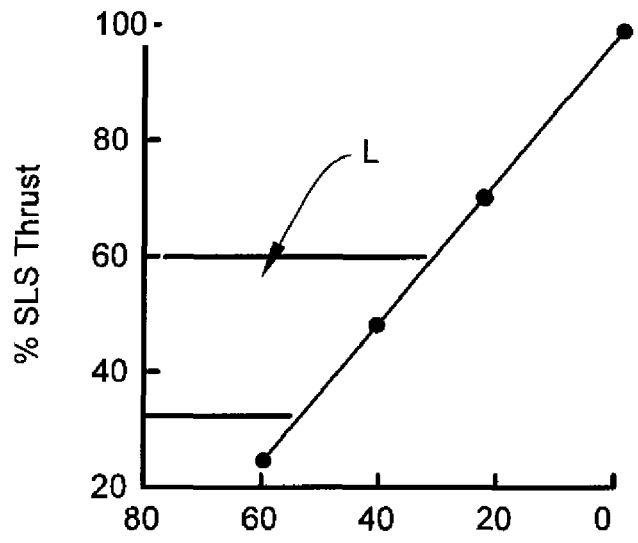
FIG. 2A is a graph depicting a thrust vs. fan stator setting characteristic of the gas turbine engine of the present invention.
Figure 2B:
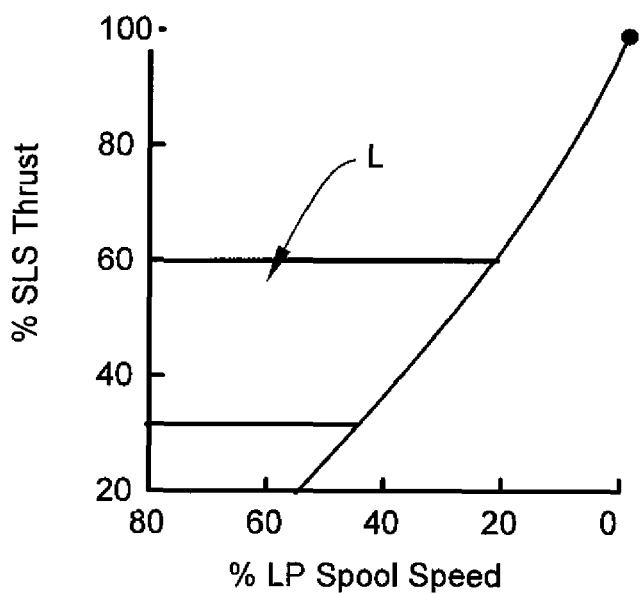
FIG. 2B is a graph depicting a thrust vs. speed characteristic of a prior art gas turbine engine.

In operation, the engine 10 generates thrust for aircraft propulsion in a known manner, while the FLADE stage discharges bleed air flow through the bleed air outlets 54. FIG. 2A shows how the thrust of the fan 14 is modulated or varied. The speed of the LP spool (and thus the fan 14) are kept constant, or nearly so, at a maximum or near-maximum RPM, in all flight conditions. To reduce the thrust to the required levels during approach and landing, shown in zone "L", the fan IGVs 32 and optionally the variable interstage vanes 36 are selectively closed to lower the fan flow and pressure ratio, which lowers the engine thrust (the larger numbers along the horizontal axis of FIG. 2A indicating increasing closure of the stator assembly). This ability to keep the LP spool at full speed at reduced thrust allows the discharge of the FLADE stage 44 to remain at constant flow and pressure ratio levels across the entire thrust band of interest. Thus, the aircraft can operate with high levels of lift enhancement or other bleed flow energy-dependent functions, while the engine thrust is low. In contrast, the percentage of sea-level static (SLS) thrust in a prior art engine is generally proportional to the speed of the LP spool, as shown in FIG. 2B. To reduce the thrust to the required levels during approach and landing, the speed "N1" of the low pressure turbine and fan must necessarily be reduced, reducing flow and pressure levels available for bleed air flow.

The FLADE inlet guide vanes 50 are used to modulate the bleed air flow, and are nominally at some partially-closed setting. In a multi-engine installation, if one engine fails, FLADE inlet guide vanes 50 would move from the nominal setting to a full open setting. Flow and pressure will increase to keep the total bleed air flow energy level constant. Mach numbers in the internal aircraft ducting will not change since flow and pressure will change along a fixed area operating line. Since the LP spool is already at maximum RPM, response to an engine out emergency will be very fast. The FLADE stage flow and pressure levels can be selected to match the wing lift enhancement or other bleed air flow needs, while the fan 14 and core system can be optimized for the specific in-flight mission needs.

Figure 3:
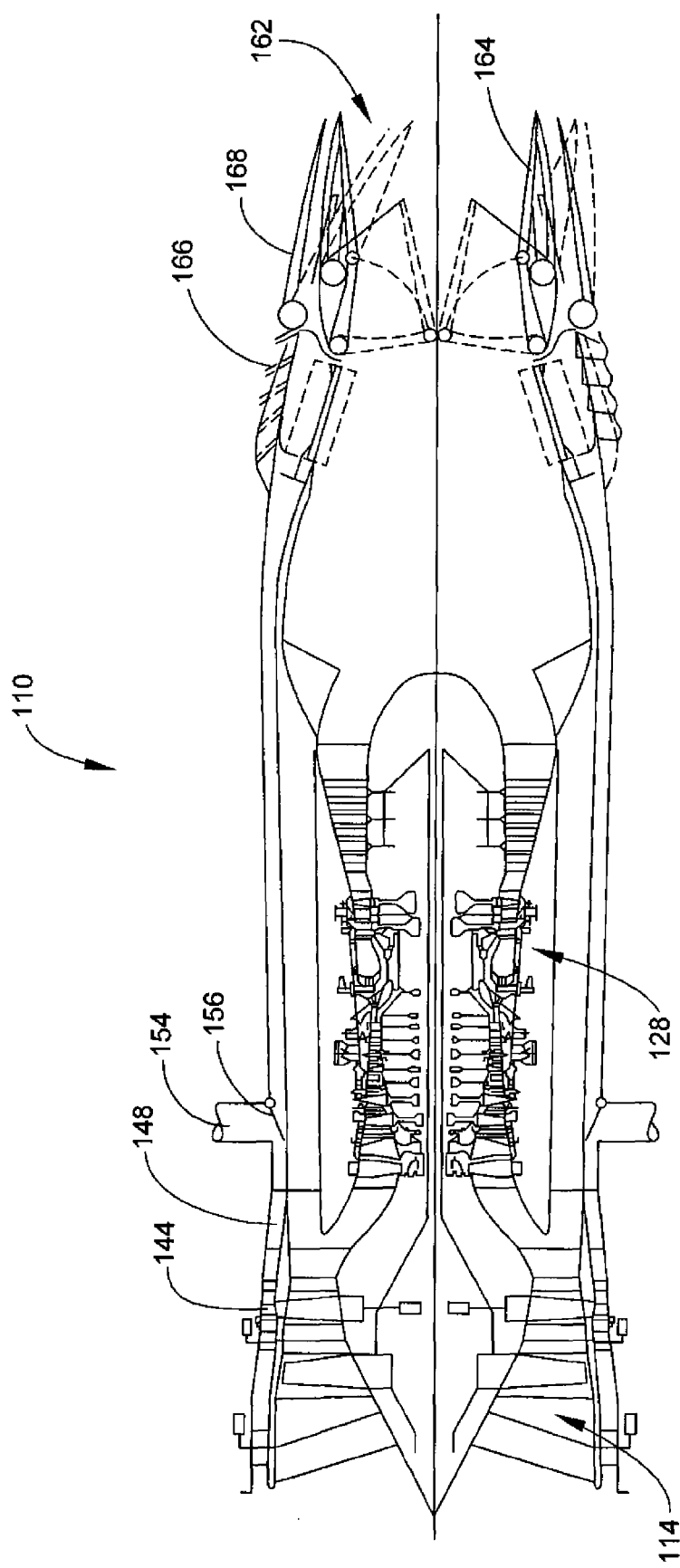
FIG. 3 is a schematic cross-sectional view of a gas turbine engine constructed according to another aspect of the present invention.

FIG. 3 illustrates an engine 110 similar to engine 10 and having a fan 114, a core 128, a FLADE stage 144 positioned in a fan outer duct 148, and an exhaust nozzle 162. In the illustrated example, the exhaust nozzle 162 is a so-called "2-D" design having moveable flaps 164 that may be used to change a throat area and/or an exit area, denoted "A8" and "A9" respectively in accordance with conventional practice, in order to accommodate changes in the operating cycle of the engine 110. The flaps 164 can also be used to provide thrust vectoring. The exhaust nozzle 162 also includes reverser cascade vanes 166 which generate reverse thrust when the flaps 164 are moved to a fully closed position, shown in phantom lines. The present invention may also be used with a conventional axisymmetric nozzle design (not shown). A FLADE nozzle 168 is disposed around the exhaust nozzle 162 and is connected to the fan outer duct 148. When bleed air valves 156 are closed, the bleed air outlets 154 are shut off and the FLADE stage discharge exits the FLADE nozzle 168. This flow could be used for cooling the exhaust nozzle 162 or for in-flight performance enhancements. In such cases it may be desirable to size the FLADE stage 144 with more flow than is needed for wing lift enhancement or other bleed air functions.

Figure 4:
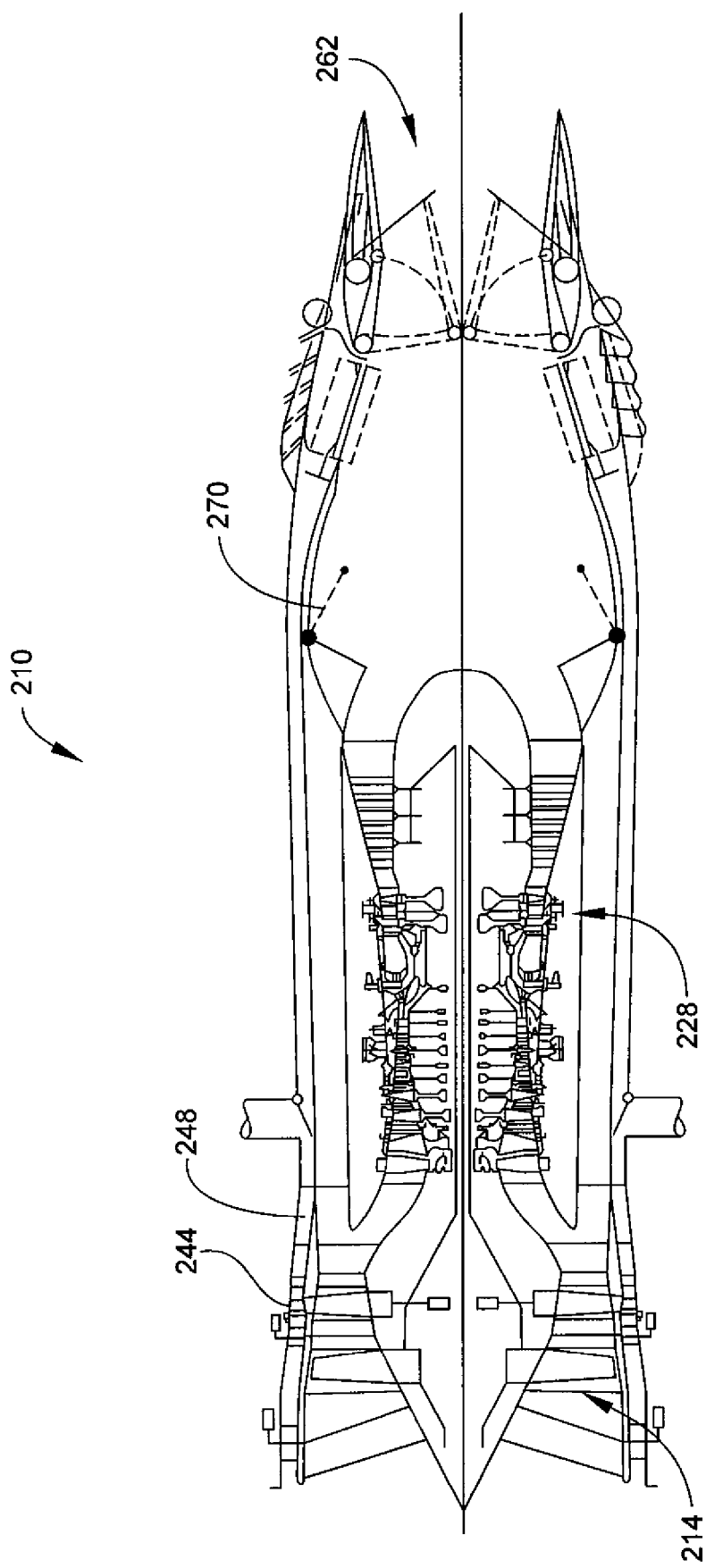
FIG. 4 is a schematic cross-sectional view of a gas turbine engine constructed according to another aspect of the present invention.

With proper selection of flade pressure ratio it would be possible to introduce any excess FLADE flow into the primary engine flow stream to eliminate the need for a separate FLADE nozzle. This concept is depicted in FIG. 4, which shows an engine 210 similar to engine 10 and having a fan 214, a core 228, a FLADE stage 244 positioned in a fan outer duct 248, and an exhaust nozzle 262. FLADE injector doors 270 are positioned upstream of the exhaust nozzle 262. They are moveable between a closed position in which the aft end of the fan outer duct 248 is blocked, and an open position in which the FLADE stage discharge is injected or dumped into the mixed flow stream upstream of the exhaust nozzle 262. This flow dump will tend to cause an accompanying fan operating line change, which may be corrected by a change in the throat area of the exhaust nozzle 262. If this operating line change can be tolerated in a particular application, a fixed area exhaust nozzle (not shown) may be used.

Figure 5:
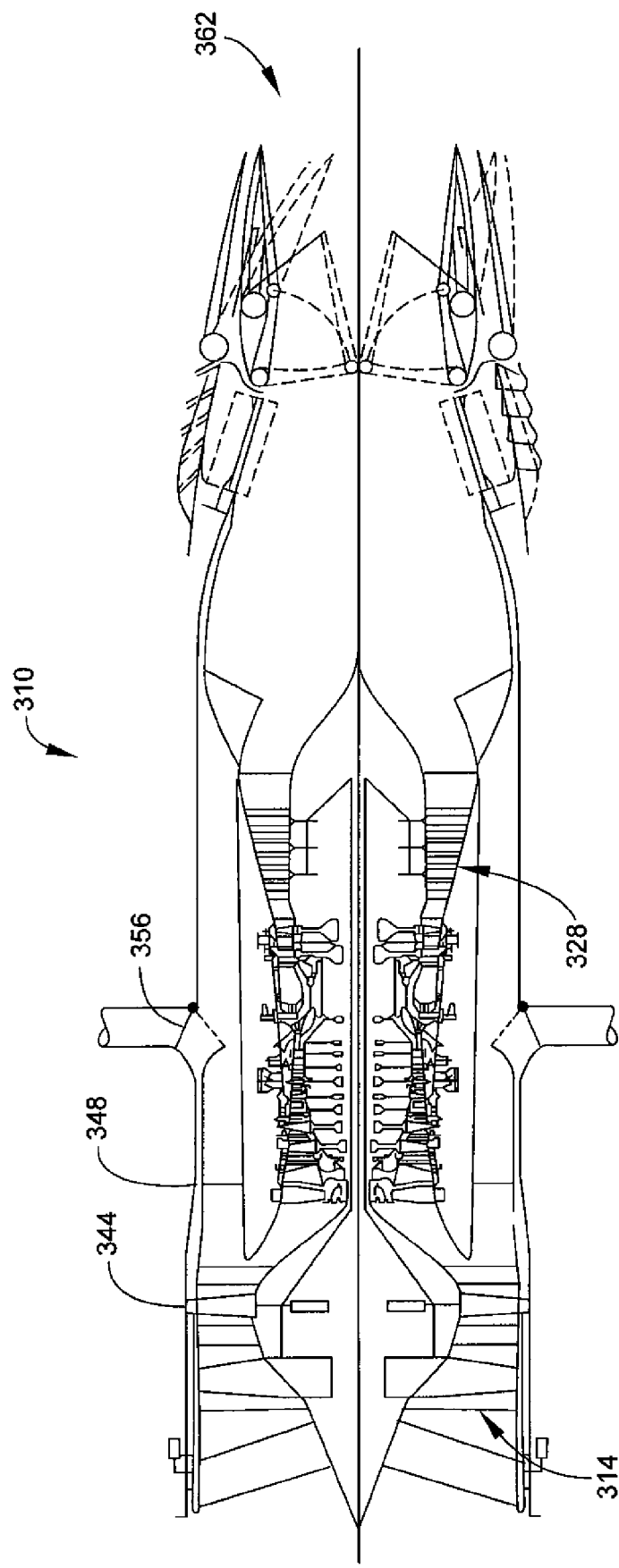
FIG. 5 is a schematic cross-sectional view of a gas turbine engine constructed according to yet another aspect of the present invention.

FIG. 5 depicts yet another engine 310 similar to engine 10 and having a fan 314, a core 328, a FLADE stage 344 positioned in a fan outer duct 348, and an exhaust nozzle 362. The fan outer duct 348 terminates upstream of the core exit. When the bleed air valves 356 are open, the FLADE stage discharge flows through the bleed air outlets 354. When the bleed air valves 356 are closed, the FLADE stage discharge mixes with the bypass flow from the fan 314. As with the engine 210 described above, no separate FLADE nozzle is required.

The foregoing has described a gas turbine engine having a modulated flow fan. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of operating a gas turbine engine, comprising:
   (a) burning a fuel in a turbomachinery core to produce a first flow of pressurized combustion gases;
   (b) extracting energy from the first flow of pressurized combustion gases and using the energy to generate a first flow of pressurized air with a rotating fan;
   (c) rotating the fan at a constant speed at a maximum RPM in all flight conditions;
   (d) selectively varying a flow area through the fan to vary the first flow of pressurized air while the fan rotates at the constant speed; and
   (e) using the fan to mechanically drive a FLADE stage comprising a supplementary fan disposed in a fan outer duct, so as to generate a pressurized bleed air flow having a magnitude independent of the first flow of pressurized air, wherein discharge of the FLADE stage remains at a constant flow and pressure ratio level.

2. The method of claim 1 further including:
   (a) passing a portion of the flow of pressurized air from the fan around the core through a bypass duct;
   (b) combining the flow of pressurized combustion gases from the core and the first flow of pressurized air from the bypass duct; and
   (c) discharging the combined flows downstream.

3. The method of claim 2 further including discharging the combined exhaust flow through an exhaust nozzle to increase its velocity.

4. The method of claim 2 further including selectively receiving at least a portion of the pressurized bleed air flow and directing it into the bypass duct.

5. The method of claim 2 further including selectively receiving at least a portion of the pressurized bleed air flow and directing it into the combined flow.

* * * * *